United States Patent
Noh et al.

(10) Patent No.: US 9,716,256 B2
(45) Date of Patent: Jul. 25, 2017

(54) BATTERY PACK (71) Applicant: SAMSUNG SDI CO., LTD., Yongin-si, Gyeonggi-do (KR)

(72) Inventors: Kyoung-Hwan Noh, Yongin-si (KR); Ik-Jae Jeong, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 116 days.

(21) Appl. No.: 14/308,777

(22) Filed: Jun. 19, 2014

(65) Prior Publication Data
US 2015/0064542 A1   Mar. 5, 2015

(30) Foreign Application Priority Data

Sep. 3, 2013   (KR) .......................... 10-2013-0105690

(51) Int. Cl.
*H01M 6/42*     (2006.01)
*H01M 2/10*     (2006.01)
*H01M 2/02*     (2006.01)
*H01M 2/14*     (2006.01)

(52) U.S. Cl.
CPC ....... *H01M 2/1016* (2013.01); *H01M 2/0217* (2013.01); *H01M 2/1061* (2013.01); *H01M 2/1077* (2013.01); *H01M 2/14* (2013.01); *H01M 2220/20* (2013.01); *H01M 2220/30* (2013.01)

(58) Field of Classification Search
CPC ............. H01M 2/1056; H01M 2/0217; H01M 2/1061; H01M 2/1077; H01M 2/14; H01M 2220/20; H01M 2220/30
See application file for complete search history.

(56) References Cited

U.S. PATENT DOCUMENTS

2006/0049799 A1* 3/2006 Hamada .............. H01M 2/1061
                                                      320/112
2012/0315508 A1   12/2012 Kurita
2013/0236761 A1    9/2013 Seong et al.

FOREIGN PATENT DOCUMENTS

| EP | 2 317 586 A1 | 5/2011 |
| EP | 2 381 507 A1 | 10/2011 |
| EP | 2 575 193 A1 | 4/2013 |
| EP | 2 624 330 A1 | 8/2013 |
| JP | 2006-73461 A | 3/2006 |
| JP | 2006-286357 A | 10/2006 |
| JP | 2009-238643 A | 10/2009 |
| JP | 2012-256467 A | 12/2012 |
| KR | 10-2012-0055158 A | 5/2012 |

OTHER PUBLICATIONS

European Search Report dated Jan. 22, 2015.
Korean Office Action dated Dec. 7, 2016.

* cited by examiner

*Primary Examiner* — Raymond Alejandro
(74) *Attorney, Agent, or Firm* — Lee & Morse P.C.

(57) ABSTRACT

A battery pack includes a battery assembly including battery cells and spacers that are alternately arrayed, a side plate extending across a side of the battery assembly, and a motion prevention unit protruding from the side plate toward the battery assembly so as to cover a portion of the battery assembly, the motion prevention unit being arrayed on the spacers.

19 Claims, 8 Drawing Sheets

BATTERY PACK

CROSS-REFERENCE TO RELATED APPLICATION

Korean Patent Application No. 10-2013-0105690, filed on Sep. 3, 2013, in the Korean Intellectual Property Office, and entitled: "Battery Pack," is incorporated by reference herein in its entirety.

BACKGROUND

1. Field

One or more embodiments relate to a battery pack.

2. Description of the Related Art

In general, unlike a primary battery that is not rechargeable, a secondary battery is rechargeable and dischargeable. The secondary battery is used as an energy source in mobile devices, electric vehicles, hybrid vehicles, electric bicycles, uninterruptible power supplies (UPSs), and the like. According to a type of an external device using the secondary battery, the secondary battery may be in a form of a single battery, or in a form of a battery pack including a plurality of battery cells connected and combined into one unit.

Small mobile devices such as mobile phones may be operated for a predetermined time based on output and capacity of a single battery. However, with electric vehicles, hybrid vehicles, or the like that are driven over extended periods of time or consume a large amount of power, a plurality of battery cells may be provided in the form of a battery pack to address such output and capacity issues. An output voltage or an output current provided to the electric vehicles may be increased by increasing the number of built-in battery cells.

SUMMARY

Embodiments are directed to a battery pack including a battery assembly including battery cells and spacers that are alternately arrayed, a side plate extending across a side of the battery assembly, and a motion prevention unit protruding from the side plate toward the battery assembly so as to cover a portion of the battery assembly, the motion prevention unit being arrayed on the spacers.

The battery cells and the spacers may be adjacent to each other and each of the battery cells may be inserted into an adjacent one of the spacers.

The spacers may include an accommodation unit that accommodates at least one of the battery cells.

The accommodation unit may cover an outer periphery of an adjacent one of the battery cells.

The spacers may each include an interposing unit between battery cells that are adjacent to each other, and an edge unit extending from an edge of the interposing unit so as to cover an outer periphery of the battery cells.

The motion prevention unit may prevent movement of the battery cells by engaging the edge unit of at least one of the spacers.

The motion unit partially covers the battery cells, the battery cells being exposed by the motion prevention unit.

Battery cells that are different from each other may be inserted into respective sides of the spacers.

The motion prevention unit may be plural in number such that a plurality of motion prevention units formed at fixed intervals along a length direction of the side plate.

The motion prevention units may be located at fixed intervals along the battery assembly. Each of the motion prevention units may be above one of the spacers.

The motion prevention units may be located along the battery assembly above alternate ones of the spacers.

The side plate may include a pair of side plates that face each other and have the battery assembly in between. The motion prevention unit may include pairs of motion prevention units facing each other from the pair of side plates.

The battery pack may further include an end plate forming a closed end portion between the pair of side plates, thereby defining a case frame having an interior.

The pair of side plates and the end plate may be integral with each other.

The battery assembly may be inserted into interior of the case frame via an open ended portion of the case frame opposite the closed end portion. A closing plate may be coupled to the side plate at the open ended portion of the case frame.

A stepped portion for supporting a bottom surface of the battery assembly may be located on the side plate.

The motion prevention unit and the stepped portion may be respectively located on an upper portion and a lower portion of the side plate that are opposite to each other.

The stepped portion may extend across an entire length of the side plate.

The stepped portion may cover an edge portion of the bottom surface of the battery cell that is adjacent to the side plate. A center of the battery cell may be exposed by the stepped portion.

The stepped portion may extend across an entire bottom surface of battery cells disposed along the battery assembly.

BRIEF DESCRIPTION OF THE DRAWINGS

Features will become apparent to those of ordinary skill in the art by describing in detail exemplary embodiments with reference to the attached drawings in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

As used herein, expressions such as "at least one of," when preceding a list of elements, modify the entire list of elements and do not modify the individual elements of the list.

Figure 1:
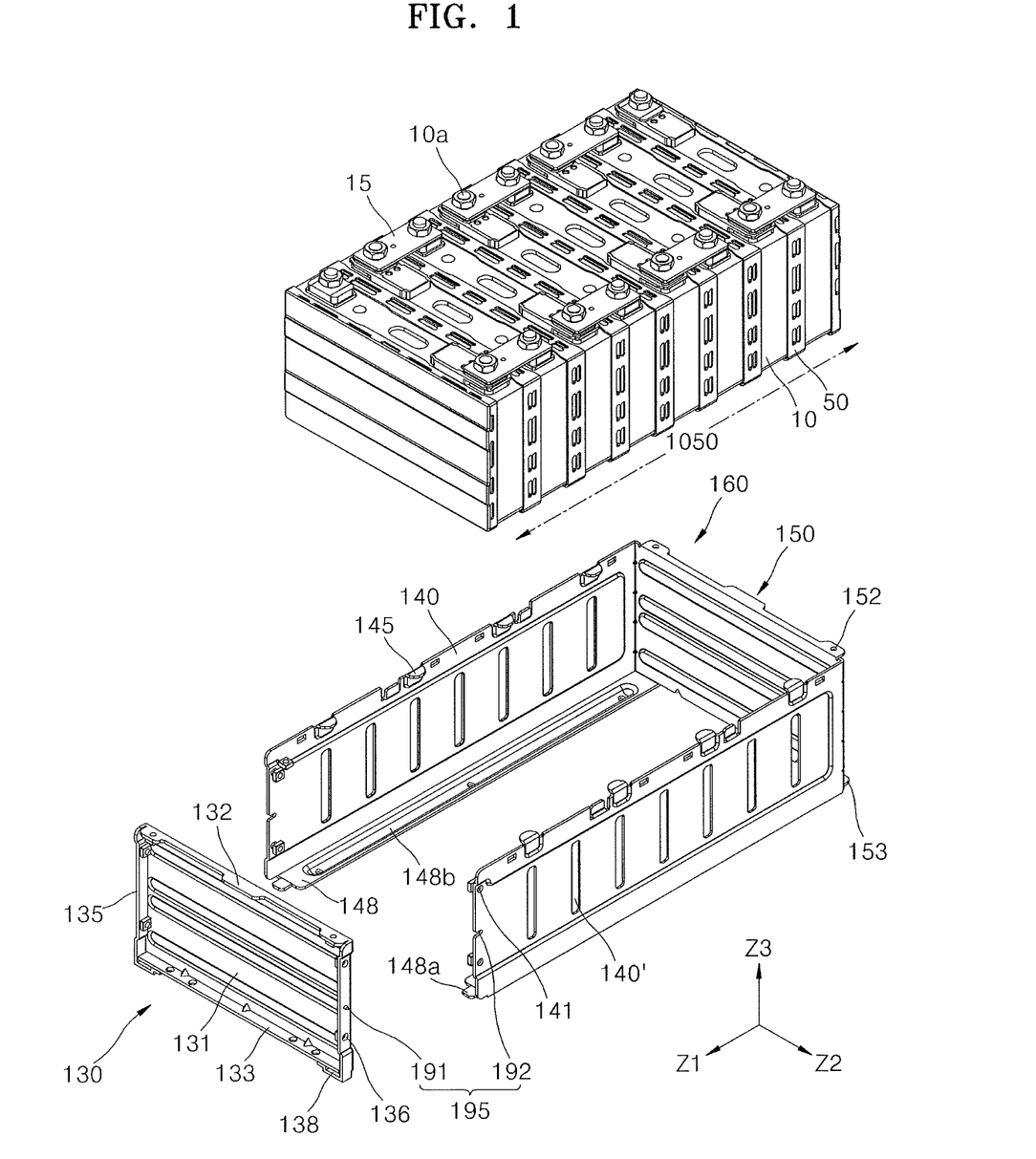
FIG. 1 illustrates an exploded perspective view of a battery pack according to an embodiment.
Figure 2:
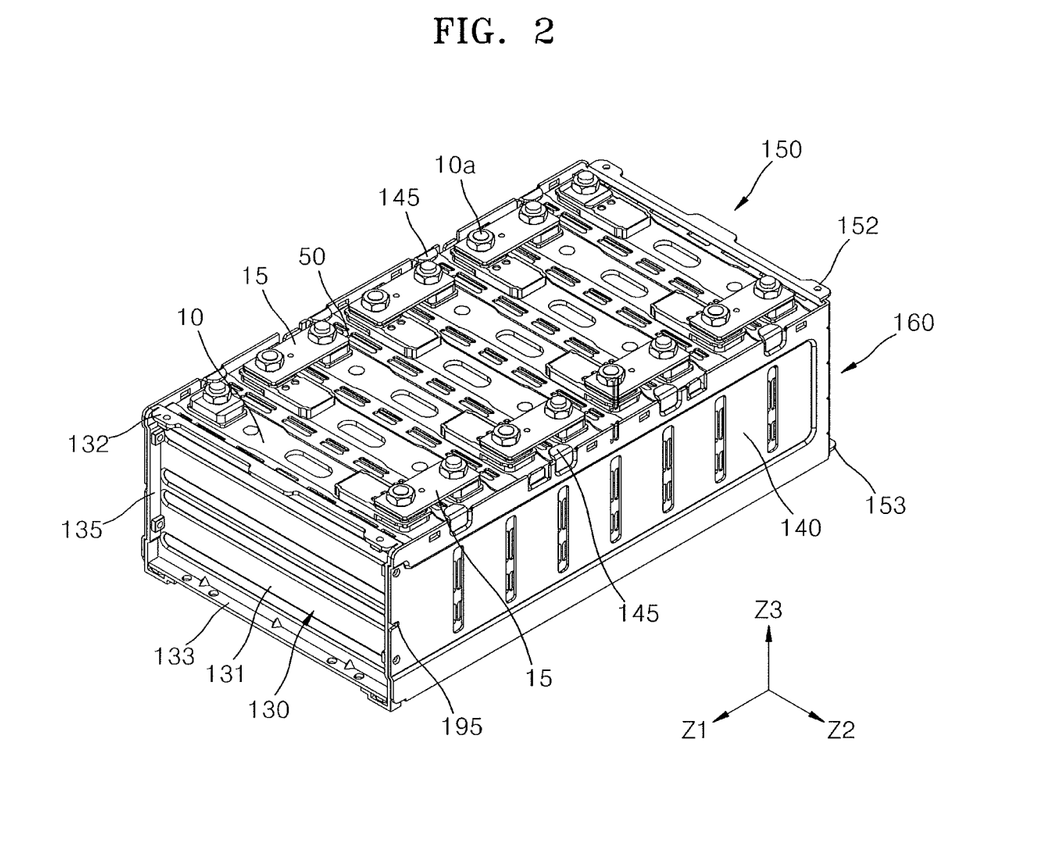
FIG. 2 illustrates a perspective view of the battery pack of FIG. 1.
Figure 3:
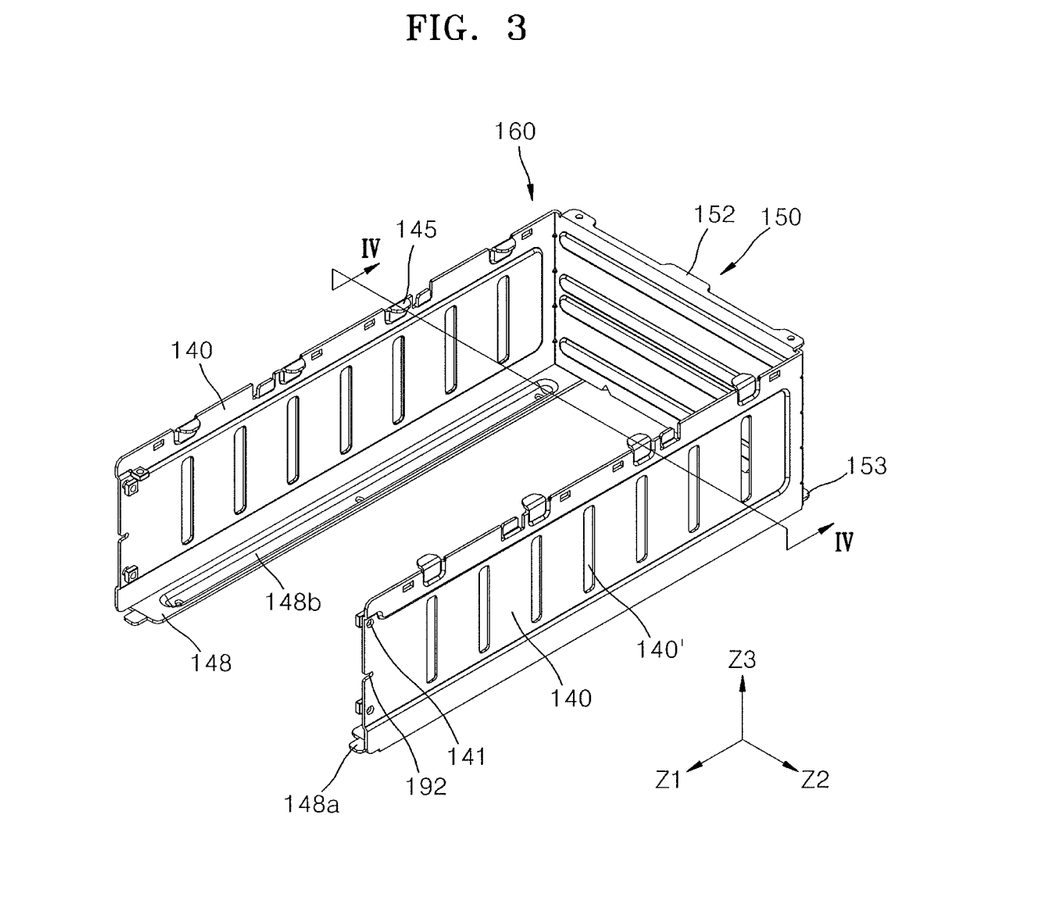
FIG. 3 illustrates a view of a case frame of FIG. 1.
Figure 4:
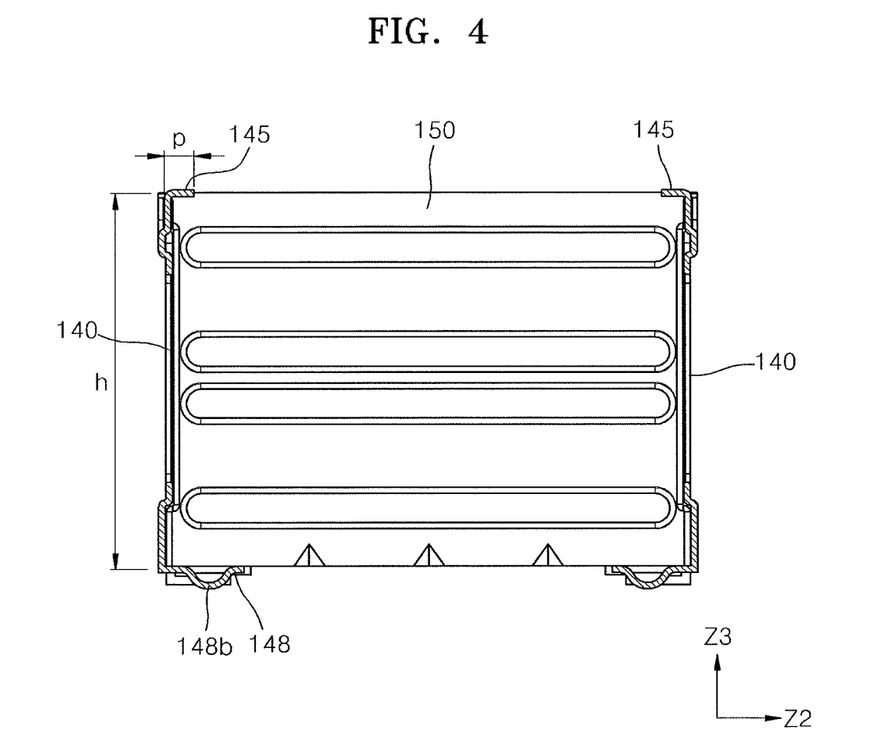
FIG. 4 illustrates a cross-sectional view of FIG. 3 cut along the lines IV-IV of FIG. 3.

FIG. 1 illustrates an exploded perspective view of a battery pack according to an embodiment. FIG. 2 illustrates a perspective view of the battery pack of FIG. 1. FIG. 3 illustrates a view of a case frame 160 of FIG. 1. FIG. 4 illustrates a cross-sectional view of FIG. 3 cut along the lines IV-IV of FIG. 3.

Referring to FIGS. 1 to 3, the battery pack includes a plurality of battery cells 10 that are arrayed along an array direction (±Z1 direction), and plates 130, 140 and 150 that surround the battery cells 10.

The plates 140 and 150 may form the case frame 160 and the plate 130 is referred to herein as the closing plate 130. The battery pack may include combination structure made up of the closing plate 130 and the case frame 160 to accommodate the battery cells 10 that are arrayed in the array direction (±Z1 direction) and may structurally combine and then modularize the battery cells 10.

The case frame 160 may have an open ended portion to accommodate the battery cells 10, and the closing plate 130 may be coupled to the open ended portion of the case frame 160 to close the open ended portion of the case frame 160.

In one or more embodiments, a battery assembly 10 50 may be formed as an assembly including the battery cells 10 arrayed in the array direction (±Z1 direction) and a spacer 50 between the battery cells 10. The case frame 160 may be formed to cover three sides of battery assembly 1050 that is arrayed in the array direction (±Z1 direction).

For example, the case frame 160 may include a pair of side plates 140 that extend to cover both sides of the battery cells 10 in the array direction (±Z1 direction), and an end plate 150 disposed between the pair of side plates 140 so as to cover an external surface of the battery assembly 1050. In some implementations, the side plate 140 and the end plate 150 may be coupled to each other without using a coupling member, but by using coupling points such as welding. In other implementations, the pair of side plates 140 and the end plate 150 may be integrally formed. The term "integrally formed" may indicate, for example, that the side plate 140 and the end plate 150 are smoothly connected to each other without any joints. For example, the case frame 160 may be formed by bending a single raw material sheet and using only the single raw material sheet without a separate coupling member. Separate coupling members for facilitating coupling of the side plate 140 and the end plates 150, such as bolts and nuts, may be omitted between the side plate 140 and the end plate 150. Moreover, when the side plate 140 and the end plate 150 are formed by using a single raw material sheet, and the side plate 140 and the end plate 150 may be connected without coupling points such as welding. Accordingly, the side plate 140 and the end plate 150 may be smoothly connected without joints.

The closing plate 130 may be coupled to the open ended portion of the case frame 160. For example, the battery assembly 1050 may be accommodated in the case frame 160 by pressing battery assembly 1050 toward the end portion of the case frame 160, which is closed due to the end plate 150. Then, the closing plate 130, which is for closing the open ended portion of the case frame 160, may be coupled to the open ended portion of the case frame 160. For example, the case frame 160 and the closing plate 130 may be coupled by using a mechanical coupling method. The closing plate 130 may slide along an assembly direction and thus may be inserted in the open ended portion of the case frame 160. The case frame 160 and the closing plate 130, disposed to overlap each other, may be coupled by matching coupling holes 136 and 141 that are respectively formed at an end portion of the side plate 140 near the open ended portion of the case frame 160 and at a side flange portion 135 of the closing plate 130. Then, coupling members may be inserted in the arrayed coupling holes 136 and 141.

According to another implementation the closing plate 130 and the case frame 160 may be coupled by various other mechanical coupling methods such as, for example, hook coupling. For example, the closing plate 130 may slide along an assembly direction and thus may be inserted in the open ended portion of the case frame 160. Once the closing plate 130 is inserted in the case frame 160, in order to prevent the closing plate 130 from being unintentionally disassembled from the case frame 160, the closing plate 130 and the case frame 160 may be hook coupled. The hook coupling may include a hook step portion (not shown) and a hook hole (not shown) that are formed at a location where the closing plate 130 and the case frame 160 face each other. As the closing plate 130 is positioned in the open ended portion of the case frame 160 along the assembly direction, the hook step portion of the closing plate 130 may form the hook coupling by being inserted into the hook hole of the case frame 160. Once the hook step portion has formed the hook coupling, the hook hole may prevent the hook step portion from being decoupled. Thus, a stable hook coupling may be formed.

The closing plate 130 and the end plate 150 may be disposed at opposing ends of the battery assembly 1050. The closing plate 130 and the end plate 150 may respectively include upper flange portions 132 and 152 and lower flange portions 133 and 153 that are bent from edges in an opposite direction from the battery cells 10. The upper flange portions 132 and 152 and lower flange portions 133 and 153 may be bent from edges of the closing plate 130 and the end plate 150 in the opposite direction opposite from the battery cells 10. The upper flange portions 132 and 152 and lower flange portions 133 and 153 may be respectively formed in an upper portion and a lower portion of the closing plate 130 and the end plate 150. The upper flange portions 132 and 152 and lower flange portions 133 and 153 may provide a coupling position for coupling with adjacent battery packs that are stacked in a vertical direction (±Z3) or a horizontal direction (±Z2). Coupling holes for screw coupling may be formed in the upper flange portions 132 and 152 and lower flange portions 133 and 153. In addition, the upper flange portions 132 and 152 and lower flange portions 133 and 153 may reinforce the mechanical strength of the closing plate 130 and the end plate 150.

The closing plate 130 may include a base plate 131 disposed to face the battery cells 10 and may further include the upper flange portion 132, the lower flange portion 133, and the side flange portion 135 that are bent from the base plate 131 in the direction opposite to the battery cells 10. The side flange portion 135 may facilitate coupling with the side plate 140.

According to an implementation, the closing plate 130 and the side plate 140 may be coupled to each other by matching the coupling hole 136 formed in the side flange portion 135 of the closing plate 130 with the coupling hole 141 formed at an open ended portion of the side plate 140, and then inserting coupling members into the coupling holes 136 and 141.

The side plates 140 may be disposed on sides of the battery cells 10. The side plates 140 may be disposed to cover the sides of the battery cells 10 that are arrayed in the array direction (±Z1 direction). The side plates 140 may be disposed as a pair on both sides of the battery cells 10 that are opposite to each other. The side plates 140 may extend along the array direction (±Z1 direction) of the battery cells 10, and may be coupled to the closing plate 130 that is disposed at an end.

A heat dissipation hole 140' may be formed in the side plate 140. For example, the heat dissipation hole 140' may be formed at a plurality of positions of the side plate 140 in a constant pattern. The heat dissipation hole 140' may allow the battery cells 10 to be exposed to external air so that heat generated in the battery cells 10 may be quickly dissipated.

The side plate 140 may be in the form of a plate as a whole, and may include a step portion 148 that is bent toward the battery cells to support a portion of a bottom surface of the battery cells 10. For example, the pair of side plates 140 disposed on opposite sides of the battery cells 10, and which are thus disposed on opposite sides of the battery assembly may support the bottom surface of the battery cells 10 by using a pair of the stepped portions 148 bent in directions facing each other.

The stepped portion 148 may extend throughout the overall length of the side plate 140 in the array direction (±Z1 direction) of the battery cells 10. The stepped portion 148 may extend across the bottom surfaces of the battery cells in the array direction (±Z1 direction) of the battery cells 10.

An open ended portion 148a of the stepped portion 148 may be slidingly coupled to the lower flange portion 133 of the closing plate 130. An assembly hole 138 may be formed in the lower flange portion 133 so that the open ended portion 148a of the stepped portion 148 and the assembly hole 138 may be assembled by sliding the open ended portion 148a of the stepped portion 148 into the assembly hole 138. When positions of the side plate 140 and the closing plate 130 are aligned so that the open ended portion 148a of the stepped portion 148 and the assembly hole 138 are slidingly coupled to each other, coupling members may be inserted through the respective coupling holes 136 and 141 of the closing plate 130 and the side plate 140. Thus, the side plate 140 and the closing plate 130 may be coupled to each other.

For example, the assembly hole 138 may be formed on a bottom of the lower flange portion 133, which is formed from a piece that is coupled to the bottom of the lower flange portion 133 and bent to define the assembly hole 138. The open ended portion 148a of the step portion 148 may overlap the lower flange portion 133 and be inserted into and assembled to the assembly hole 138 of the lower flange portion 133.

In the assembly between the side plate 140 and the closing plate 130, an assembly position of the side plate 140 and the closing plate 130 may be aligned by using an assembly guide 195 provided at an assembly portion of the side plate 140 and the closing plate 130. In other implementations, the assembly position of the side plate 140 and the closing plate 130 may be aligned by using the open ended portion 148a of the stepped portion 148 and the assembly hole 138 of the lower flange portion 133.

The coupling holes 136 and 141 may be formed in the open ended portion of the side plate 140 and the side flange portion 135 of the closing plate 130. After aligning the assembly position of the side plate 140 and the closing plate 130, the coupling holes 136 and 141, which are respectively formed in the side flange portion 135 of the closing plate 130 and in the side plate 140, may be overlapped to match each other. Then, coupling members may be inserted into the respective coupling holes 136 and 141 of the closing plate 130 and the side plate 140 that are matched with respect to each other. Thus, the side plate 140 and the closing plate 130 may be coupled to each other. In this case, surfaces of the side plate 140 and the closing plate 130 may contact each other at a corner of the battery pack. The side plate 140 may form an accommodation space for accommodating the battery assembly 1050 and may be coupled to the side flange portion 135 and the lower flange portion 133 of the closing plate 130 by using the open ended portion and the stepped portion 148. A leg unit 148b may be formed to downwardly (−Z3 direction) protrude from the stepped portion 148 and may support the weight of the entire battery pack.

A lower portion of the battery cells 10 may be exposed by the side plate 140 except for a portion that is supported by the stepped portion 148 of the side plate 140. External air may be allowed to flow between the battery cells 10 and across the lower portion of the battery cells 10 exposed by the side plate 140, and the heat dissipation of the battery cells 10 may be accelerated. The stepped portion 148 may cover an edge portion that is adjacent to the side plate 140 from among the bottom surface of the battery cells 10, and at least the center of the battery cells 10 may be exposed by the stepped portion 148.

The stepped portion 148, which is bent to support a bottom surface of the battery assembly 1050, may be formed on a lower portion of the side plate 140. A motion prevention unit 145, which is formed to cover a top surface of the battery assembly 1050 so as to suppress vertical movement or vibrations and fix a position of the battery cells 10, may be formed on an upper portion of the side plate 140. The top surface of the battery assembly 1050 may be a surface on which an electrode terminal 10a of the battery cells 10 is formed, and the bottom surface of the battery assembly 1050 may be a surface opposite to the top surface of the battery assembly 1050.

The stepped portion 148 may protrude from the lower portion of the side plate 140 toward the battery cells 10 so as to support the bottom surface of the battery assembly 1050. The motion prevention unit 145 may protrude from the upper portion of the side plate 140 toward the battery cells 10 so as to cover the top surface of the battery assembly 1050. For example, the stepped portion 148 and the motion prevention unit 145 may be formed as a pair that protrudes from each of the pair of side plates 140 that accommodates the battery assembly 1050 and may face each other. The stepped portion 148 and the motion prevention unit 145 may protrude toward a direction facing each other (±Z2 direction).

The motion prevention unit 145 may be bent from the side plate 140 so as to cover the top surface of the battery assembly 1050. For example, the motion prevention unit 145 may press against the top surface of the battery assembly 1050 so as to suppress vertical (±Z3 direction) movement of the battery cells 10 and suppress the movement or vibrations of the battery cells 10. The motion prevention unit 145 may be disposed to cover a portion of the top surface of the battery assembly 1050 by contacting a portion of the top surface of the battery assembly 1050 or may be spaced apart from the top surface. For example, the motion prevention unit 145 may contact the battery assembly 1050 so as to press against the battery cells 10 so that the battery cells 10 do not move; or may be spaced apart from the battery assembly 1050 by a predetermined distance and suppress movement of the battery cells 10 from exceeding the predetermined distance.

The motion prevention unit 145 may be formed to cover a portion of the top surface of the battery assembly 1050, and cover an edge of the battery assembly 1050 that is adjacent to the side plate 140. The center of the battery assembly 1050 may be exposed by the motion prevention unit 145.

As illustrated in FIG. 4, the motion prevention unit 145 may be bent from the upper portion of the side plate 140 in a width direction (±Z2 direction) of the battery cells 10, and may have a predetermined protrusion length p. The protrusion length p of the motion prevention unit 145 may extend along the width direction (±Z2 direction) of the battery cells 10 up to a location where the electrode terminal 10a is formed.

The protrusion length p of the motion prevention unit 145 may be limited, in the width direction (±Z2 direction) of the battery cells 10, up to the location where the electrode terminal 10a is formed so that the motion prevention unit 145 that protrudes from the case frame 160 does not hinder the insertion of the battery assembly 1050 through the open ended portion of the case frame 160. For example, the motion prevention unit 145 may extend from the pair of side plates 140 facing each other, toward the battery cells 10, but only up to the location where the electrode terminals 10a of the battery cells 10 are formed. Accordingly, the electrode terminal 10a of the battery cells 10 may be prevented from being caught by the motion prevention unit 145 when the battery cells 10 are assembled in the case frame 160.

As illustrated in FIG. 2, the motion prevention unit 145 may be plural in number such that a plurality of motion prevention units are formed at fixed intervals along the upper portion of the side plate 140. The motion prevention unit 145 may not be formed across the entire length of the side plate 140 like the stepped portion 148, but may be formed at fixed intervals along a length direction (±Z1 direction) of the side plate 140. In some implementations, the motion prevention unit 145 may partially press against the battery assembly 1050 at different positions in the array direction (±Z1 direction) so as to suppress the movement or vibrations of the battery cells 10. The battery assembly 1050 may be formed such that a mechanical interference exists between adjacent elements. Accordingly, the position of the entire battery assembly 1050 may be fixed by partially pressing the battery assembly 1050.

The battery assembly 1050 may include the battery cells 10 and the spacer 50 that are alternately arrayed. Battery cells 10 that are adjacent to each other may be inserted into one spacer 50. The battery cells 10 that are adjacent to each other and the spacer 50 may be formed such that an interference structure exists therebetween. The interference structure of the battery cells 10 and the spacer 50 will be more specifically described below.

As illustrated in FIG. 2, the motion prevention unit 145 may be formed above the spacer 50. The motion prevention unit 145 may directly contact the top surface of the spacer 50 or may be separated from the top surface of the spacer 50 by the predetermined distance. If the motion prevention unit 145 were to be formed above the battery cells 10, the motion prevention unit 145 could directly press against the upper portion of the battery cells 10 so as to suppress the movement of the battery cells 10. The pressing against the upper portion of the battery cells 10 could impact the performance of the battery cells 10 by adversely affecting recharging and discharging operations of the battery cells 10. Thus, according to one or more embodiments, the motion prevention unit 145 may be formed above the spacer 50 so as to not directly affect the recharging and discharging operations of the battery cells 10. The motion prevention unit 145 formed above the spacer 50 may indirectly support the battery cells 10 by interfering with movement of the spacer 50.

The motion prevention unit 145 may be formed at fixed intervals along the length direction (±Z1 direction) of the side plate 140, and may protrude toward and above the battery assembly 1050. Specifically, the motion prevention unit 145 is formed at fixed intervals along the top surface of the spacer 50 for each of the battery assembly 1050. The motion prevention unit 145 may be formed to cover the top surface of the spacer 50 and may suppress the movement of the battery cells 10 by pressing the upper portion of the spacer 50. The spacer 50 may accommodate a portion of the battery cells 10 that are adjacent to each other, and may interfere with the battery cells 10 due to the interference structure of the spacer 50 and the battery cells 10. Thus, the movement of the battery cells 10 may be indirectly suppressed.

The motion prevention unit 145 may be formed on the top surface of the spacer 50 among the battery assembly 1050, such that the motion prevention unit 145 may be arrayed along the battery assembly. The motion prevention unit 145 may be formed on the top surface of the spacer 50, and not formed on the top surface of the battery cells 10. The top surface of the battery cells 10 may be exposed from the motion prevention unit 145. The upper portion of the battery cells 10 may be exposed from the motion prevention unit 145. Accordingly, the battery cells 10 may be exposed to external air through the upper portion of the battery cells 10, and the heat dissipation of the battery cells 10 may be accelerated.

The motion prevention unit 145 may be formed on each of the spacers 50 along the battery assembly 1050. In other implementations, as illustrated in FIG. 2, the motion prevention unit 145 may be formed on alternate ones of the spacers 50 that are arrayed along the battery assembly 1050. For example, the motion prevention unit 145 may be formed only on odd numbered spacers 50 disposed along the battery assembly 1050, or only on even numbered spacers 50 along the battery assembly 1050. Two battery cells 10 may be inserted into each spacer 50. Accordingly, two battery cells 10 may be restrained by restraining the one spacer 50 via use of the motion prevention unit 145. Thus, even if the motion prevention unit 145 is only formed on the alternately arrayed spacers 50, all the battery cells 10 may be prevented from moving.

For example, the motion prevention unit 145 may be formed on each of the side plates 140 disposed on the both sides of the battery assembly 1050, such that a pair of motion prevention units 145 may be formed facing each other. The motion prevention units 145 that protrude from the side plates 140 may be formed above the same spacer 50 as a pair of motion prevention units 145 facing each other.

According to an embodiment, the motion prevention unit 145 may be provided as a piece that protrudes from the upper portion of the side plate 140. The motion prevention unit 145 may press against the top surface of the spacer 50, contact the top surface of the spacer 50, or be separated from the top surface of the spacer 50 by a predetermined distance. The motion prevention unit 145 and the spacer 50 may be arranged in various ways in which the motion prevention unit 145 is disposed above the spacer 50 so as to press against the spacer 50 so that the motion prevention unit 145 may prevent the spacer 50 from moving by more than a predetermined distance.

The lower portion of the battery assembly 1050 may be supported by the stepped portion 148, and the upper portion of the battery assembly 1050 may be prevented from moving by the motion prevention unit 145. The vertical (±Z3 direction) movement of the battery assembly 1050 may be restricted to be within a maximum movement distance defined by the stepped portion 148 in the lower portion of the battery assembly 1050, and the motion prevention unit 145 in the upper portion of the battery assembly 1050. Vibrations or movement of the battery cells 10 may be suppressed so as to prevent damage or change in position of the battery cells 10, thus preventing degradation in output performance of the battery cells 10.

When the battery assembly 1050 is inserted through the open ended portion of the case frame 160, the motion prevention unit 145 may be formed at a location that does not hinder the insertion of the battery assembly 1050. As illustrated in FIG. 4, a height h of the motion prevention unit 145 may be sufficiently higher than the top surface of the battery cells 10 so as not to hinder the insertion of the battery cells 10, but may also be sufficiently low so that the motion prevention unit 145 may contact or be close to the top surface of the spacer 50 so as to suppress the movement of the spacer 50.

The motion prevention unit 145 may protrude from the upper portion of the side plate 140 toward the battery cells 10. The protrusion length p of the motion prevention unit 145 may be limited to protruding up to the location of the electrode terminal 10a of the battery cells 10. If the motion prevention unit 145 protrudes farther than the location of the electrode terminal 10a of the battery cells 10, the electrode terminal 10a may be blocked by the motion prevention unit 145 when the battery cells 10 are inserted, and thus, the assembly process may be difficult.

The side plate 140 may be in a form of a plate and may include the stepped portion 148 that is bent to support a portion of the bottom surface of the battery assembly 1050, and the motion prevention unit 145 that is bent to cover a portion of the top surface of the battery assembly 1050. The bottom surface and the top surface of the battery cells 10 may be surfaces that are adjacent to the sides of the battery assembly 1050 on which the side plate 140 extends across and that are facing each other.

The pair of side plates 140 that are disposed on the opposite sides of the battery assembly 1050 may prevent the battery assembly 1050 from vibrating or moving in the vertical direction (±Z3 direction), by using the pair of motion prevention units 145 and the pair of stepped portions 148 that are bent in the direction facing each other (±Z2 direction). The motion prevention unit 145 and the stepped portion 148 may be integrally formed with the side plate 140 and may be bent from a body of the side plate 140 toward the battery cells 10.

Referring back to FIGS. 2 and 3, the case frame 160 may be formed to surround the three sides of the battery assembly 1050, and may additionally support the top surface and the bottom surface of the battery assembly 1050 through the motion prevention unit 145 and the stepped portion 148, which are integrally formed with the case frame 160 (specifically, the side plate 140). The case frame 160 may be integrally formed to cover five surfaces of the battery assembly 1050. The case frame 160 according to the embodiments may be smoothly formed without joints. For example, the case frame 160 may be formed by bending a single raw material sheet, and may have a structure in which the end plate 150 is smoothly connected with the side plate 140 provided on both sides of the end plate 150. The motion prevention unit 145 and the stepped portion 148 may be integrally formed and smoothly connected with the side plate 140. The case frame 160 that may support the five surfaces of the battery assembly 1050 may be simply formed by continuously bending the raw material sheet.

If the case frame 160 were not formed by using a single raw material sheet, but by coupling or combining a plurality of separate members, additional processes to form the case frame 160 would be necessary. Thus, not only would the number of processes increase, but quality management would difficult due to faulty products generated during the additional processes. Also, mechanical strength and durability of the case frame 160 formed by coupling or combining a plurality of members may be less than that of the case frame 160 formed by a single raw material sheet.

After accommodating the battery assembly 1050 in an inner space of the case frame 160, the closing plate 130 may be coupled to the open ended portion of the case frame 160. Accordingly, all six surfaces of the battery assembly 1050 may be restrained, and thus, the battery pack may be formed in which the plurality of battery cells 10 are structurally combined.

According to a comparative example to the embodiments, a stepped portion or a motion prevention unit that support the bottom surface or the top surface of a battery assembly may not be provided on a case frame (or specifically, on side plate). In such a comparative example, after accommodating the battery assembly in the inner space of the case frame, the closing plate may be coupled to the open ended portion of the open ended portion of the case frame, and then, a bottom plate and a top plate may be respectively coupled to the bottom surface and the top surface of the battery assembly so that the all six surfaces of the battery assembly are restrained. That is, compared to the present embodiments, in the comparative example, a bottom plate and a top plate for respectively supporting the bottom surface and the top surface of the battery assembly 1050 are additionally necessary. Due to the additional elements (i.e., the bottom plate and the top plate), not only does the number of elements increase, but an additional coupling structure for coupling the bottom plate, the top plate and surrounding elements (i.e., the case frame and the closing plate) is further required. Thus, the entire structure of the battery pack and the assembly process thereof may become complicated.

According to an embodiment, the stepped portion 148 and the motion prevention unit 145 that are integrally formed in the case frame 160 support the battery assembly 1050 in the vertical direction (±Z3 direction). Accordingly, additional plates or coupling processes are not necessary. Thus, the entire structure may be simplified, and the assembly time may be reduced.

The heat dissipation hole 140' may be formed in the side plate 140. For example, the heat dissipation hole 140' may be formed in plurality along the array direction (±Z1 direction) of the battery cells 10. The heat dissipation hole 140' may allow the battery cells 10 to be exposed to external air so that heat generated in the battery cells 10 may be quickly dissipated.

A boss member for mounting a circuit board may be formed on the side plate 140. The circuit board may form a battery management system (BMS). A surface of the side plate 140 may face a side of the battery cells 10, and the circuit board may be mounted on an opposite surface of the side plate 140. The circuit board may monitor a recharge/discharge state of the battery cells 10 and control an overall recharge/discharge operation of the battery pack.

For example, the boss member may be arranged at four positions in a lattice arrangement corresponding to the circuit board having an approximately rectangular or square shape, or may be arranged at a multiple of four positions in a lattice arrangement corresponding to a plurality of circuit boards. A coupling hole may be formed in the circuit board.

A screw member penetrating the coupling hole may be fastened to the boss member on the side plate 140 so that the circuit board is fixed on the side plate 140.

Figure 5:
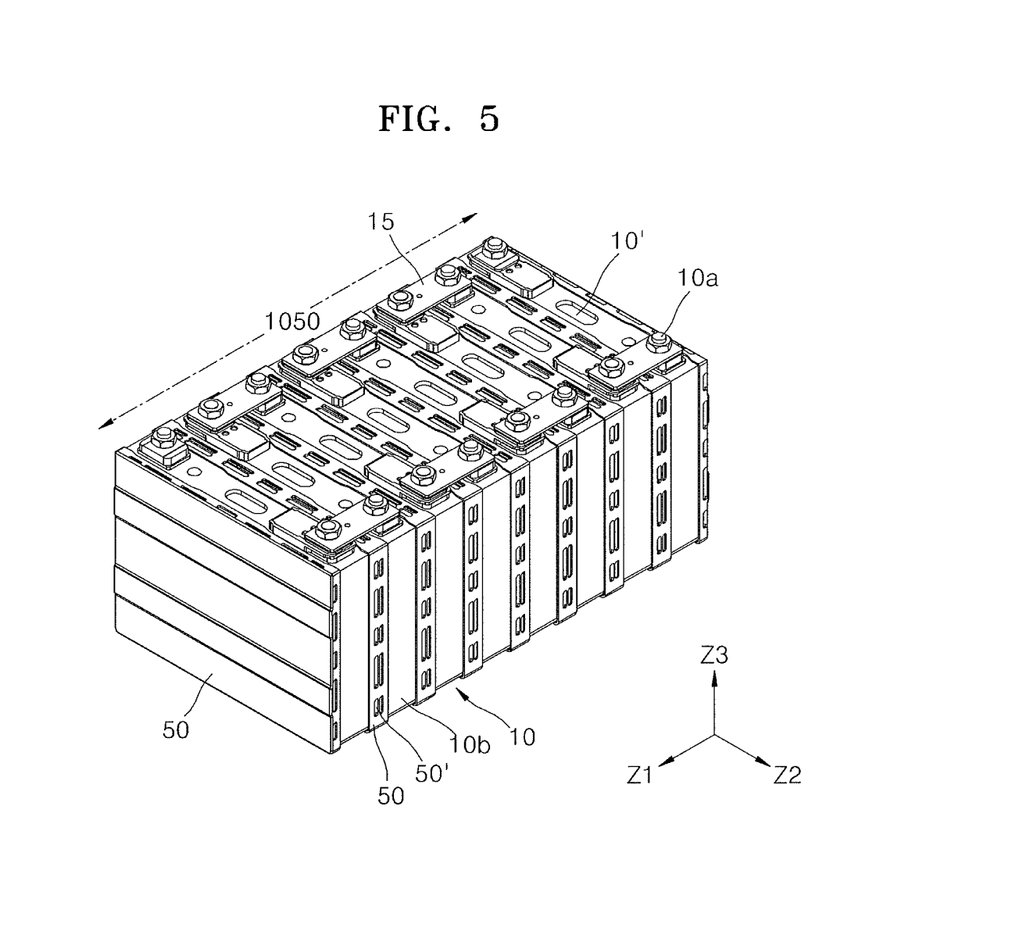
FIG. 5 illustrates a perspective view of a battery assembly of FIG. 1.

FIG. 5 illustrates a perspective view of the battery assembly 1050 of FIG. 1. The battery assembly 1050 may be arranged in a direction (±Z1 direction), and may include the battery cells 10 and the spacer 50 that are alternately arrayed in the direction (±Z1 direction).

The battery cells 10 may be secondary batteries such as lithium-ion batteries, or may be any one of various types of secondary batteries, such as cylindrical secondary batteries, prismatic secondary batteries, or a polymer secondary batteries.

Each of the battery cells 10 may include a case 10b; an electrode assembly (not shown) accommodated in the case 10b; and the electrode terminal 10a electrically connected to the electrode assembly and protruding out of the case 10b. The electrode terminal 10a may form the upper portion of the battery cells 10 and be exposed outside of the case 10b. Although not illustrated, the electrode assembly includes a positive electrode, a separator, and a negative electrode, and may be formed as a winding type or a stack type electrode assembly. The case 10b accommodates the electrode assembly therein, and the electrode terminal 10a is protruds out of the case 10b for electrical connection between the electrode assembly and an external circuit.

The battery cells 10 that are adjacent to each other may be electrically connected to each other via serial or parallel connection of the electrode terminal 10a. The adjacent electrode terminals 10a may be connected to each other via a bus bar 15.

A safety vent 10' may be formed on the case 10b. The safety vent 10' may have a relatively weak strength and may function to eject internal gas by breaking open when an internal pressure over a critical point is generated in the case 10b.

The spacer 50 may be disposed between the battery cells 10 that are adjacent to each other. The spacer 50 may electrically insulate the battery cells 10 that are adjacent to each other. For example, when the case 10b has an electrical polarity, the spacer 50 formed of an insulative material may be disposed so as to block electrical interference between the battery cells 10 that are adjacent to each other.

Also, the spacer 50 may provide a heat dissipation path between the battery cells 10. For example, a heat dissipation hole 50' may be formed in the spacer 50. The heat dissipation hole 140', which is formed on the side plate 140 that is assembled to cover a side of the spacer 50, and the heat dissipation hole 50' of the spacer 50, which is formed at a position opposite to the heat dissipation hole 140' of the side plate 140, may be connected to each other so as to provide a heat dissipation path between the battery cells 10.

The spacer 50 may be disposed between the battery cells 10 and may suppress thermal expansion or swelling of the battery cells 10. The case 10b of the battery cells 10 may be formed of a deformable metal material. The spacer 50 may be formed of a less-deformable material such as a polymer, so as to suppress the swelling of the battery cells 10.

The spacer 50 may not only be disposed between the battery cells 10 that are adjacent to each other, but may also be disposed to contact an outermost surface of the battery cells 10 in the array direction (±Z1 direction) of the battery cells 10. As illustrated in FIG. 1, the end plate 150 and the closing plate 130 are disposed on either side of the array direction (±Z1 direction) of the battery cells 10. The spacer 50 may be respectively disposed between the end plate 150 and the battery cells 10 and between the closing plate 130 and the battery cells 10, for electrical insulation between the end plate 150 and the battery cells 10 and between the closing plate 130 and the battery cells 10.

Figure 6A:
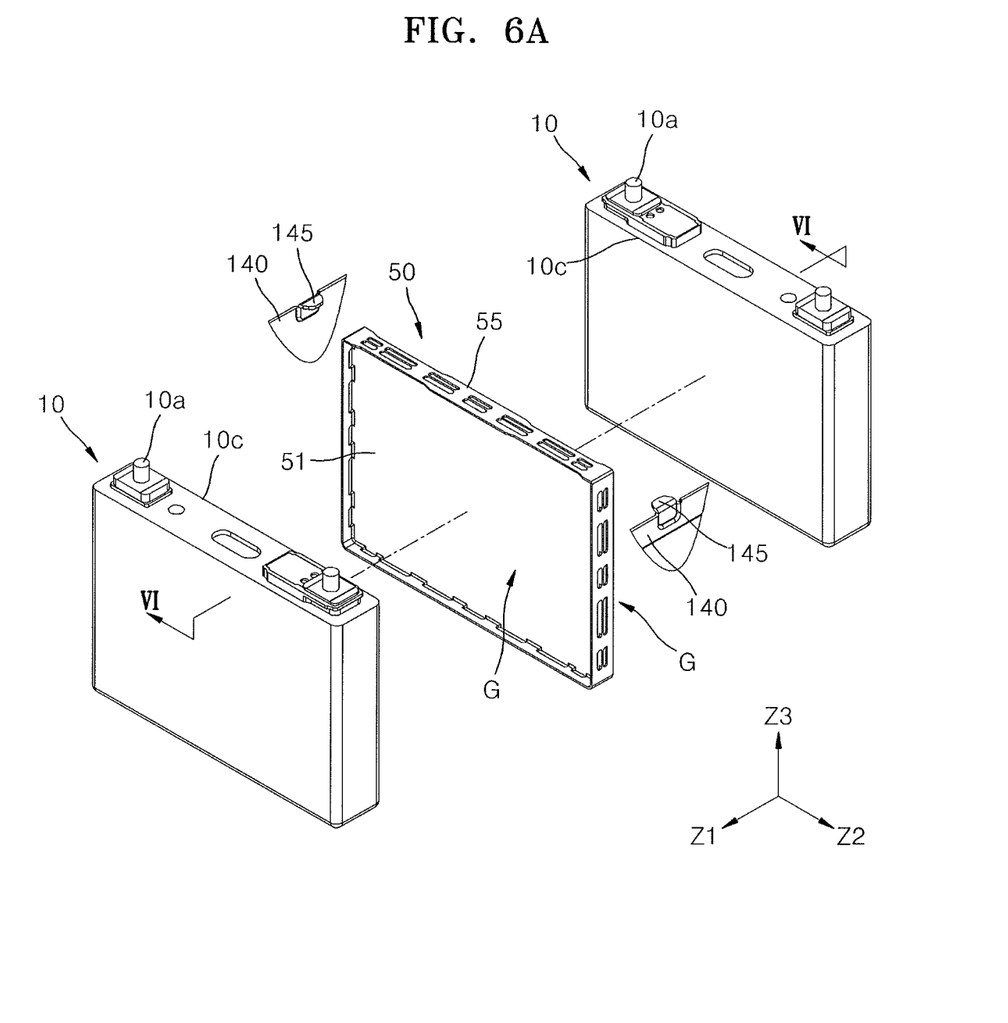
FIG. 6A illustrates a view of an assembly structure of a battery cell and a spacer.
Figure 6B:
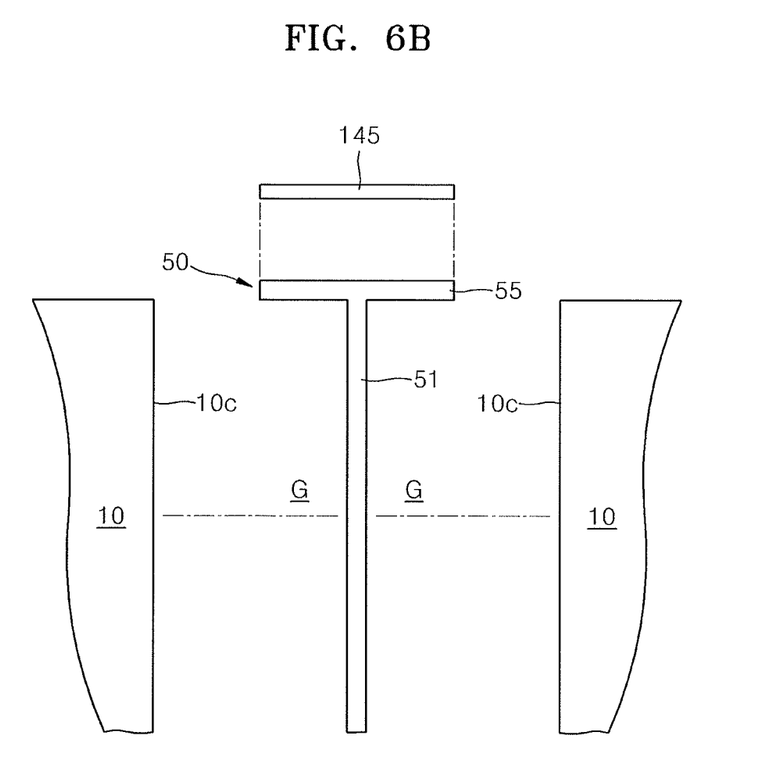
FIG. 6B illustrates a cross-sectional view of FIG. 6A cut along the lines Vi-VI of FIG. 6A.

FIGS. 6A and 6B illustrate views depicting an assembly structure between the battery cells 10 and the spacer 50. FIG. 6B illustrates a cross-sectional view of FIG. 6A cut along the lines VI-VI of FIG. 6A.

Referring to FIGS. 6A and 6B, the battery cells 10 that are adjacent to each other may be inserted into the spacer 50. That is, the battery cells 10 that are adjacent to each other and the spacer 50 are formed such that an interference structure exists therebetween. Specifically, excluding the spacer 50 disposed on both ends of the battery assembly 1050, two battery cells 10 may be assembled on respective sides of the spacer 50, with the spacer 50 being disposed in the center.

The spacer 50 may include an accommodation unit G that accommodates at least a portion of the battery cells 10 that are adjacent to each other. For example, the spacer 50 may include the accommodation unit G that may accommodate two different battery cells 10 in the array direction (±Z1 direction). The accommodation unit G may accommodate a portion of the battery cells 10 and cover an outer periphery 10c of the battery cells 10.

The spacer 50 may include an interposing unit 51 disposed between the battery cells 10 that are adjacent to each other and may further include and an edge unit 55 that extends from an edge of the interposing unit 51 so as to cover the outer periphery 10c of the battery cells 10. The interposing unit 51 and the edge unit 55 may form the accommodation unit G, which may be concavely indented so as to accommodate a portion of the battery cells 10. The battery cells 10 may be accommodated and inserted into the area of the accommodation unit G that is defined by the interposing unit 51 and the edge unit 55.

The edge unit 55 may be formed in a closed-loop form along the edge of the interposing unit 51. For example, the edge unit 55 may be continuously formed along an outer periphery of the interposing unit 51, or may be formed in a continuous closed-loop form along a line of the outer periphery 10c of the battery cells 10. In other implementations, the edge unit 55 of the spacer 50 may cover a portion of the battery cells 10 so that the spacer 50 engages the battery cells 10.

According to the embodiments, while the edge unit 55 of the spacer 50 surrounds the outer periphery 10c of the battery cells 10, the motion prevention unit 145 may be formed above the spacer 50 so that the movement of the battery cells 10 that engage with the spacer 50 may be suppressed by using the motion prevention unit 145.

Figure 7:
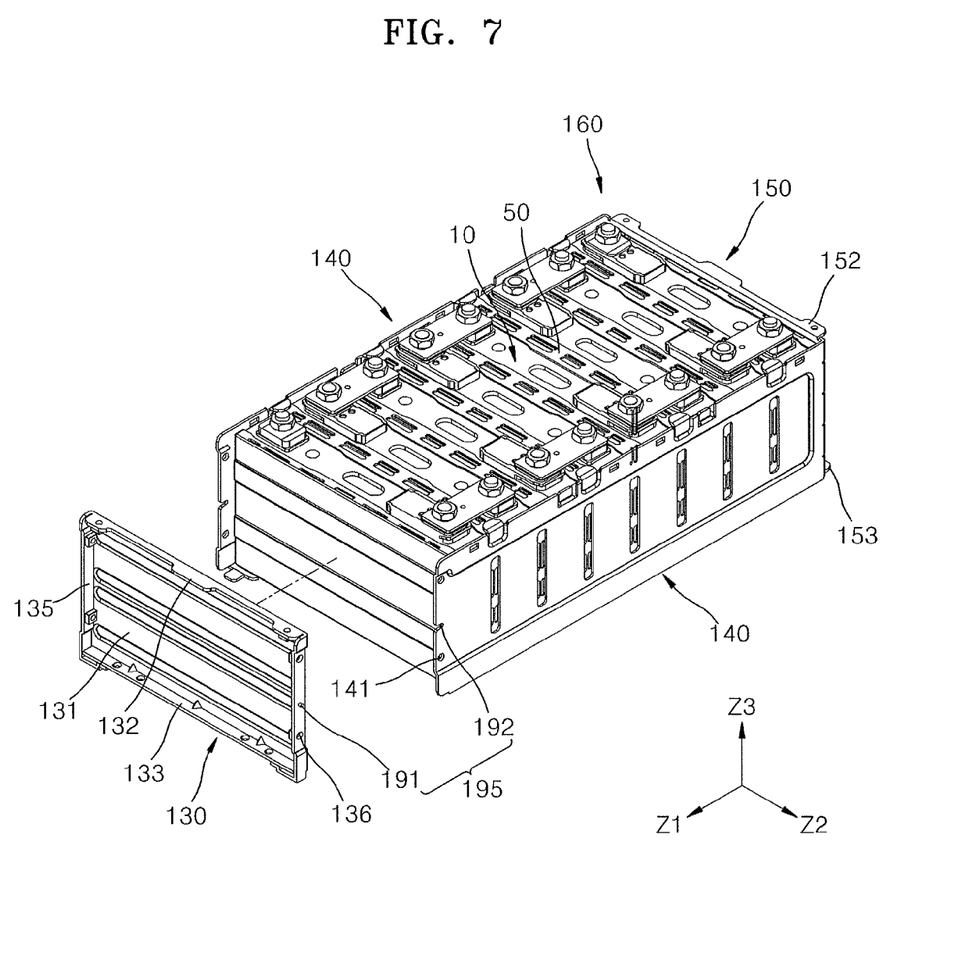
FIG. 7 illustrates a perspective view of an assembly between a closing plate and a case frame.

FIG. 7 illustrates a perspective view of an assembly between the closing plate 130 and the case frame 160.

As illustrated in FIG. 7, the assembly guide 195 may be formed at a location where the closing plate 130 faces the case frame 160. For example, the assembly guide 195 may include an assembly pin 191 that protrudes from the side flange portion 135 of the closing plate 130. The assembly pin 191 may guide the assembly between the closing plate 130 and the case frame 160. Regarding the assembly between the closing plate 130 and the case frame 160, the closing plate 130 may slidingly contact along an inner surface of the case frame 160 and thus may overlap an end portion of the case frame 160. The coupling holes 136 and 141, respectively formed in the overlapping side flange portion 135 of the closing plate 130 and the end portion of the case frame 160, may be matched to each other. Then, the coupling members may be inserted into the coupling holes 136 and 141. The assembly pin 191 of the closing plate 130 may guide an assembly position between the closing plate 130 and the side plate 140. According to the guiding of the assembly pin 191, the closing plate 130 and the side plate 140 may be assembled at a correct position, and thus, the coupling holes 136 and 141 may be matched to each other.

Hereinafter, an assembly process of the battery pack will be schematically described. An assembly process will be described in which the battery cells 10 are accommodated in the case frame 160 through the open ended portion of the case frame 160. For example, the battery assembly 1050 may be accommodated in the case frame 160 by pressing the battery assembly 1050 from the open ended portion of the case frame 160 toward the other end of the case frame 160 that is closed due to the end plate 150. In an inner space of the case frame 160, the plurality of battery cells 10 and the spacer 50 disposed therebetween may be sequentially stacked in order. Then, when all of the battery assembly 1050 is accommodated in the inner space defined by the case frame 160, the closing plate 130 for closing the open ended portion of the case frame 160 may be coupled to the open ended portion of the case frame 160.

In this case, an assembly position of the closing plate 130 that is inserted in the open ended portion of the case frame 160 may be aligned by the assembly guide 195. The assembly guide 195 may include the assembly pin 191 that protrudes from the side flange portion 135 of the closing plate 130, and an assembly rail 192 formed in the side plate 140.

The assembly pin 191 that protrudes from the closing plate 130 may be inserted in the assembly rail 192 of the side plate 140 so that the assembly pin 191 and the assembly rail 192 are aligned with respect to each other. In this aligned state, the closing plate 130 may be pressed so as to slide toward the battery assembly 1050 in a sliding direction (−Z1 direction). The closing plate 130 may be pressed so as to slide toward the battery assembly 1050 in the sliding direction (−Z1 direction) by a pressing unit (not shown) such as a presser. The closing plate 130 may slide along the inner surface of the side plate 140 until reaching a location where the closing plate 130 overlaps an open ended portion of the side plate 140. Then, when the coupling holes 136 and 141 of the closing plate 130 and the side plate 140 are matched to each other, the coupling members may be inserted into the matched coupling holes 136 and 141 so that the assembly of the battery pack is complete.

According to the method described above, the assembly pin 191 that protrudes from the overlapping side flange portion 135 of the closing plate 130 may be guided along the assembly rail 192 formed in the side plate 140 so that when the closing plate 130 slides along the array direction of the battery cells 10, a position between the closing plate 130 and the side plate 140 is not misaligned. While the closing plate 130 is aligned with respect to the side plate 140, the closing plate 130 may move to a coupling position of the side plate 140.

The assembly pin 191 of the closing plate 130 may be inserted in the assembly rail 192 formed in the side plate 140 so that the closing plate 130 and the side plate 140 may be aligned with respect to each other. The assembly rail 192 having an open side may be formed in the side plate 140. The assembly pin 191 of the closing plate 130 may be inserted via the open side of the assembly rail 192.

The assembly rail 192 has the open side. Accordingly, the assembly rail 192 does not have a closed structure that is completely surrounded by an inner wall of the side plate 140. Rather, the assembly rail 192 may be connected to the outside via the open side of the assembly rail 192 so that the assembly pin 191 may be inserted into the assembly rail 192. The open side of the assembly rail 192 may be formed in consideration of the assembly process between the closing plate 130 and the side plate 140. The closing plate 130 may slide along the inner surface of the side plate 140 so as to be coupled at a coupling position at which the closing plate 130 overlaps an end portion (specifically, the coupling hole 141) of the side plate 140. Accordingly, the assembly pin 191 of the closing plate 130 may be inserted into the open side of the assembly rail 192 and then may slide along the assembly rail 192. The assembly rail 192 may extend lengthwise in the assembly direction (−Z1 direction) of the closing plate 130. For example, the assembly rail 192 may extend lengthwise in the array direction (±Z1 direction) of the battery cells 10.

By way of summation and review, a battery pack may be a single unit structure formed by structurally combining a plurality of battery cells. Embodiments include a battery pack having an improved structure that facilitates an assembly process in which two or more of battery cells are assembled and then modularized, and the improved structure strongly restrains the battery cells.

According to the one or more embodiments, a plurality of battery cells are combined as a single pack and modularized by using a combination of a case frame having an open ended portion and a closing plate for closing the open ended portion of the case frame.

Also, a motion prevention unit and a stepped portion are formed in the case frame so as to suppress vertical movement of the battery cells and prevent modification and damage due to vibrations or movement of the battery cells. Thus, damage or change in position of the battery cells 10 may be prevented, thus preventing degradation in output performance of the battery cells 10.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A battery pack, comprising:
 a battery assembly including battery cells and spacers that are alternately arrayed in a a length direction of the battery assembly, the battery assembly having an electrode terminal protruding from an upper side thereof;
 a side plate extending across a lateral side of the battery assembly; and
 a motion prevention unit extending from the side plate along the upper side of the battery assembly, the motion prevention unit being arrayed on at least one of the spacers, wherein:
 an end portion of the electrode terminal being nearest to the side plate is spaced apart from the lateral side of the battery assembly by a second distance from the lateral side of the battery assembly in a width direction of the battery assembly,
 an end portion of the motion prevention unit being farthest from the side plate extends from the side plate by a first distance from the lateral side of the battery assembly in the width direction of the battery assembly, and the first distance from the lateral side of the battery assembly is equal to or shorter than the second distance from the lateral side of the battery assembly.

2. The battery pack as claimed in claim 1, wherein the battery cells and the spacers are adjacent to each other and each of the battery cells is inserted into an adjacent one of the spacers.

3. The battery pack as claimed in claim 2, wherein the spacers include an accommodation unit that accommodates at least one of the battery cells.

4. The battery pack as claimed in claim 3, wherein the accommodation unit covers an outer periphery of an adjacent one of the battery cells.

5. The battery pack as claimed in claim 2, wherein each of the spacers includes an interposing unit between battery cells that are adjacent to each other, and an edge unit extending from an edge of the interposing unit so as to cover an outer periphery of the battery cells.

6. The battery pack as claimed in claim 5, wherein the motion prevention unit prevents movement of the battery cells by engaging the edge unit of the at least one of the spacers.

7. The battery pack as claimed in claim 1, wherein the motion prevention unit partially covers the upper side of the battery assembly such that a center portion of the upper side of the battery assembly is exposed.

8. The battery pack as claimed in claim 1, wherein battery cells that are different from each other are inserted into respective sides of the spacers.

9. The battery pack as claimed in claim 1, wherein the motion prevention unit is plural in number such that a plurality of motion prevention units are at fixed intervals along the length direction of the side plate.

10. The battery pack as claimed in claim 9, wherein:
the motion prevention units are located at fixed intervals along the battery assembly, and
each of the motion prevention units is above each of the spacers.

11. The battery pack as claimed in claim 10, wherein the motion prevention units are located along the battery assembly above alternate ones of the spacers.

12. The battery pack as claimed in claim 1, wherein:
the side plate includes a pair of side plates that face each other and have the battery assembly in between,
wherein the motion prevention unit includes pairs of motion prevention units facing each other from the pair of side plates.

13. The battery pack as claimed in claim 12, further comprising an end plate forming a closed end portion between the pair of side plates, thereby defining a case frame having an interior.

14. The battery pack as claimed in claim 13, wherein the pair of side plates and the end plate are integral with each other.

15. The battery pack as claimed in claim 13, wherein:
the battery assembly is inserted into interior of the case frame via an open ended portion of the case frame opposite the closed end portion,
wherein a closing plate is coupled to the side plate at the open ended portion of the case frame.

16. The battery pack as claimed in claim 1, wherein a stepped portion for supporting a bottom side of the battery assembly extends from the side plate along the bottom side of the battery assembly.

17. The battery pack as claimed in claim 16, wherein the motion prevention unit and the stepped portion are respectively located on an upper portion and a lower portion of the side plate that are opposite to each other.

18. The battery pack as claimed in claim 16, wherein the stepped portion extends from an entire length of the side plate along the bottom side of the battery assembly.

19. The battery pack as claimed in claim 16, wherein:
the stepped portion partially covers the bottom side of the battery assembly such that a center portion of the bottom side of the battery assembly is exposed.

* * * * *